(No Model.)

W. WELLS & J. VOWLES.
SCOOP.

No. 448,393. Patented Mar. 17, 1891.

WITNESSES
C. J. Shipley
F. Clough.

INVENTOR
William Wells
Joseph Vowles
By Wells W. Leggett
Attorneys.

UNITED STATES PATENT OFFICE.

WILLIAM WELLS AND JOSEPH VOWLES, OF MILFORD, MICHIGAN; SAID WELLS ASSIGNOR TO FRANK ORRIS AND MARY VOWLES, OF SAME PLACE.

SCOOP.

SPECIFICATION forming part of Letters Patent No. 448,393, dated March 17, 1891.

Application filed November 24, 1890. Serial No. 372,503. (No model.)

*To all whom it may concern:*

Be it known that we, WILLIAM WELLS and JOSEPH VOWLES, citizens of the United States, residing at Milford, county of Oakland, and State of Michigan, have invented a certain new and useful Improvement in Scoops; and we declare the following to be a full, clear, and exact description of the invention, such as will enable others skilled in the art to which it pertains to make and use the same, reference being had to the accompanying drawings, which form a part of this specification.

Figure 1:
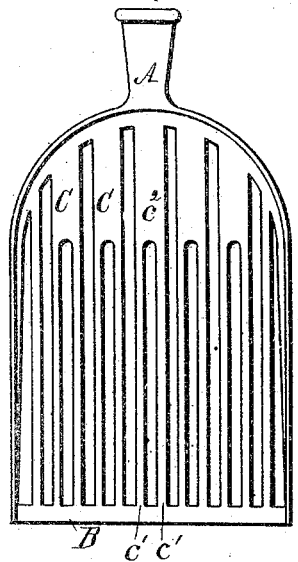
Figure 8:
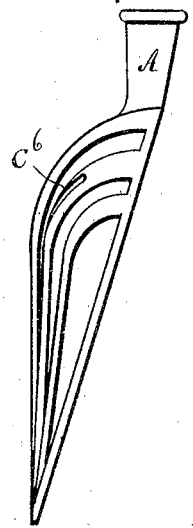
Figure 2:
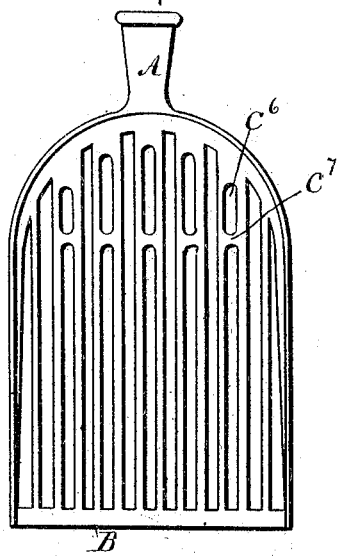
Figure 3:
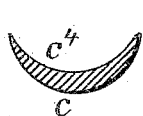
Figure 4:
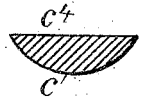
Figure 5:
Figure 6:
Figure 7:
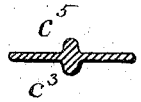

In the drawings, Figure 1 is a plan view of the scoop involving our invention. Fig. 2 is a view of a variation of the same. Fig. 3 is a cross-section of the shank of one of the double teeth shown in Fig. 1. Fig. 4 is a variation in said cross-section. Figs. 5, 6, and 7 illustrate how the shank of that double tooth opposite the handle may be formed in cross-section. Fig. 8 is a side elevation of our scoop.

This device is designed as an improvement upon the scoops illustrated in Patents No. 411,879, dated October 1, 1889, and No. 421,021, dated February 11, 1890. In the former patent the teeth extended from the forward edge back to the extreme rear. They were, however, weak and found to be liable to spring or bend laterally and so get out of shape. This was corrected in the latter of the above patents by casting therewith a uniting bar or bars at intervals. It has, however, been found to be difficult to cast the said scoops with the said bars, owing to the distortion and breaking by shrinkage in casting.

It is the purpose of our present invention to overcome these difficulties and to produce in other respects an improved article.

To this end, A represents the handle-socket; B, the scooping-edge, and C represents a series of shanks, each divided and extended at their forward ends into two tines C'. This serves to brace the said two tines thoroughly against lateral displacement and adds great strength and stiffness to the extreme rear ends, thus accomplishing a lateral stiffening in all respects equal to that in the last patent above referred to, while it dispenses with the danger of breakage from shrinkage in casting. Each of these shanks may be convex on one surface, as shown at $c$ in Fig. 3, while the opposite surface may be concaved, as shown at $c^4$ in Fig. 3; or one surface may be convex, as shown at $c$, and its opposite surface made straight, as shown at $c^4$ in Fig. 4.

We have found in practice that the greatest strain in the scoop is thrown upon the middle tine $C^2$, opposite the handle. We purpose, therefore, to provide this tine with a stiffening longitudinal flange on one side, as shown at $c^2$ in Fig. 5, or with such a stiffening-flange on both sides, as shown at $c^3$ and $c^5$ in Fig. 7; and this middle tine, as also the other tines, may be made flat in cross-section, as shown in Figs. 6 and 7, instead of curved, as shown in Figs. 3, 4, and 5.

Instead of making the shanks solid, as shown in Fig. 1, each said shank may, if desired, be provided with an opening $c^6$. This structure leaves more open space at the heel of the scoop, and the uniting portion $c^7$ serves to stiffen each couple of tines and accomplishes the bracing that is necessary at these points without endangering loss in casting by reason of shrinkage.

This shovel is designed to be made of cast metal, preferably malleable iron.

What we claim is—

1. A scoop in which the inside tines are arranged in pairs, each pair united near the point where they curve upward at the heel of the scoop, substantially as and for the purposes described.

2. A scoop with the inside tines arranged in pairs, each pair united near the point where they curve upward at the heel of the scoop, with an opening between said point of union and the extreme heel end of the tine, substantially as and for the purposes described.

3. A scoop with its inside tines arranged in pairs united near the point where they curve upward at the heel, the shank of the central pair stiffened with a longitudinal flange or flanges, substantially as and for the purposes described.

4. A scoop with its inside tines arranged in pairs, each pair united near the point where the tine curves upward at the heel, the shank beyond said point of union convexed upon one side and concaved upon its opposite side, substantially as described.

In testimony whereof we sign this specification in the presence of two witnesses.

WILLIAM WELLS.
JOSEPH VOWLES.

Witnesses:
EDWARD J. BISSELL,
JAMES H. AUSTIN.

It is hereby certified that the first named assignee in Letters Patent No. 448,393, granted March 17, 1891, upon the application of William Wells and Joseph Vowles, of Milford, Michigan, for an improvement in "Scoops," was erroneously written and printed "Frank Orris," whereas said name should have been written and printed *Frank Orvis;* and that the said Letters Patent should be read with this correction therein that the same may conform to the corrected files and records of the case in the Patent Office.

Signed, countersigned, and sealed this 14th day of April, A. D. 1891.

[SEAL.]
                                              CYRUS BUSSEY,
*Assistant Secretary of the Interior.*

Countersigned:
    C. E. MITCHELL,
        *Commissioner of Patents.*